United States Patent
Klehr

(10) Patent No.: US 12,492,920 B2
(45) Date of Patent: Dec. 9, 2025

(54) CAPACITIVE READING DEVICE FOR A POINTER INSTRUMENT

(71) Applicant: Siemens Aktiengesellschaft, Munich (DE)

(72) Inventor: Stefan Klehr, Rheinzabern (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/689,468

(22) PCT Filed: Sep. 9, 2021

(86) PCT No.: PCT/EP2021/074812
§ 371 (c)(1),
(2) Date: Mar. 6, 2024

(87) PCT Pub. No.: WO2023/036423
PCT Pub. Date: Mar. 16, 2023

(65) Prior Publication Data
US 2025/0137819 A1     May 1, 2025

(51) Int. Cl.
*G01D 5/241*     (2006.01)

(52) U.S. Cl.
CPC .................... *G01D 5/2415* (2013.01)

(58) Field of Classification Search
CPC ...... G01D 5/2415; G01D 13/00; G01D 13/02; G01D 13/22; H04Q 2209/00; H04Q 2209/10; H04Q 2209/40; H04Q 2209/43; H04Q 2209/80; G01L 19/16
See application file for complete search history.

(56) References Cited

U.S. PATENT DOCUMENTS

| | | | |
|---|---|---|---|
| 4,275,393 A | 6/1981 | Johnston | |
| 4,743,838 A | 5/1988 | Eckerle | |
| 4,924,407 A * | 5/1990 | King ................... | G01D 5/2412 340/870.37 |
| 4,999,734 A | 3/1991 | Smith | |

(Continued)

FOREIGN PATENT DOCUMENTS

| | | |
|---|---|---|
| DE | 3891367 | 3/1994 |
| EP | 3150972 | 4/2017 |
| WO | 2007147609 | 12/2007 |

OTHER PUBLICATIONS

PCT International Search Report dated May 11, 2022 based on PCT/EP2021/074812 filed Sep. 9, 2021.

*Primary Examiner* — Franklin D Balseca
(74) *Attorney, Agent, or Firm* — Cozen O'Connor

(57) ABSTRACT

A capacitive reading device for a pointer instrument, wherein n radial electrodes alternating with radial counter electrodes are arranged opposite the pointer instrument in an arc to capacitively detect the position of a rotating pointer of the pointer instrument, where the counter electrodes are electrically connected to one another and connected to a first measurement connection of a capacitance digital converter, the n electrodes are connected to a second measurement connection of the capacitance digital converter via an n×k connection matrix and a downstream 1-of-k multiplexer, the n×k connection matrix connects each of the n electrodes to in each case one of k channels of the 1-of-k multiplexer, the connection pattern varies along the arc with n variations of b from k, and where n>k≥b>1.

8 Claims, 4 Drawing Sheets

(56) References Cited

U.S. PATENT DOCUMENTS

| | | | |
|---|---|---|---|
| 6,157,311 A | | 12/2000 | Berkovich |
| 7,810,444 B2 * | | 10/2010 | Sultan .................... G01D 11/28 |
| | | | 116/288 |
| 2017/0059357 A1 * | | 3/2017 | Zips ......................... G01D 5/14 |
| 2018/0328762 A1 | | 11/2018 | Cheng et al. |

* cited by examiner

CAPACITIVE READING DEVICE FOR A POINTER INSTRUMENT

CROSS-REFERENCE TO RELATED APPLICATIONS

This is a U.S. national stage of application No. PCT/EP2021/074812 filed 9 Sep. 2021.

BACKGROUND OF THE INVENTION

1. Field of the Invention

The invention relates to a capacitive reading device for a pointer instrument.

2. Description of the Related Art

Pointer instruments already installed in the field, e.g., mano-meters or thermometers, etc., are usually read by a person on site. There is a need for these pointer instruments to be read remotely, without a person having to be present. It is moreover desirable for the measured variable indicated by the pointer position to be read automatically and made available in digital form as a measured value.

It is often the case that neither an electrical power supply nor a data line is present on site. A technical device that reads the pointer position automatically should therefore use as little energy as possible and should be capable of transmitting the measured value wirelessly. Moreover, this technical device should be inexpensive so that such an upgrade is financially viable for the operator.

Optical reading devices such as those disclosed, e.g., in WO 2007/147609 A2, U.S. Pat. No. 6,157,311 A or 4,275,393 A are sensitive to interference from extraneous light and therefore require active illumination in some cases.

Capacitive reading devices disclosed in EP 3 150 972 B1 and DE 38 91 367 C2 have a plurality of electrodes that are arranged opposite the rotating pointer of the pointer instrument on a support in a circle or arc. The measuring resolution is directly dependent on the number of electrodes and is limited by the fact that only a small number of, e.g., 8 or 16, electrodes can be connected to the measuring electronics via conventional multiplexers. Large multiplexers or solutions comprising cascaded multiplexers are resource-intensive and expensive.

SUMMARY OF THE INVENTION

It is an object of the invention to provide a device for detecting a continuously analog pointer position in a simple manner with good measuring resolution.

This and other objects and advantages are achieved in accordance with the invention a capacitive reading device for a pointer instrument, having a support that is intended to be arranged opposite a rotating pointer of the pointer instrument and upon which a multiplicity of n radial electrodes alternating with radial counter electrodes are arranged in an arc, where counter electrodes are electrically connected to one another and are attached to a first measurement interface of a capacitance digital converter, where the n electrodes are attached via an n×k connection matrix and via a downstream 1-of-k multiplexer to a second measurement interface of the capacitance digital converter, and where the n×k connection matrix connecting each of the n electrodes to one of the k channels of the 1-of-k multiplexer in each case. For the purpose of determining a position of the pointer, the connection pattern varies along the arc. The connection pattern can vary because, viewed along the arc, a non-repeating sequence for the connection pattern is produced at least sectionally for the channels. By detecting a capacitive influence of a plurality of channels, the position of the pointer can be determined via the non-repeating pattern.

For example the connection pattern along the arc can vary with n variations of b from k, where n>k≥b>1.

Moreover, the n variations of v from k channels can be formed taking a sequence of the channels into account. By taking the sequence into account, it becomes possible to determine a position of the pointer unambiguously.

Furthermore, the disclosed capacitive reading device can be configured to determine the strength of a capacitive influence of a channel. As a consequence, it is possible inter alia to ascertain which channel is most strongly capacitively influenced by the pointer. A channel that is most strongly capacitively influenced indicates that this is closest to the pointer. A less capacitively influenced channel can indicate that this is adjacent to the most strongly capacitively influenced channel. An even less capacitively influenced channel is possibly situated two positions away from the most strongly influenced channel. This applies analogously in a continuous manner for channels situated even further away. It is thereby possible in conjunction with the connection pattern to unambiguously ascertain the position of the pointer.

The radial electrodes do not necessarily have to be radially arranged or configured in a strictly linear manner; they can also be slightly obliquely radial and/or slightly crooked.

The angular range of the arc in which the electrodes are arranged around the rotational axis of the pointer should correspond at least to the deflection range of the pointer of the pointer instrument. In order for the optical reading device to be used largely irrespective of the structural format of the pointer instrument, the electrodes can be arranged in a closed circle.

With the aid of the n×k connection matrix, it is possible to represent every pointer position unambiguously on an essentially smaller number of k channels of the 1-of-k multiplexer, even with a comparatively large number of n electrodes. Assuming a "measuring window" of k adjacently disposed electrodes, within which the pointer capacitively influences b electrodes (b≤k), even in the least favorable case where the pointer influences these b electrodes identically, i.e., indistinguishably, this results in $N_{min}=k!/[(k-b)!\cdot b!]$ combinations of b from k measured values. In the most favourable case, the pointer does influence the b electrodes identically to the left and right thereof, but otherwise differently with increasing distance therefrom. This results in $N_{max}=k!/[2\cdot(k-b)!]$ variations ("combination taking the sequence into account") of b from k measured values. It is thereby possible using n electrodes ($N_{max}>n>N_{min}$) unambiguously to specify every pointer position on k channels of the 1-of-k multiplexer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below with reference to exemplary embodiments and to the figures in the drawing, in which.

DETAILED DESCRIPTION OF THE EXEMPLARY EMBODIMENTS

Identical reference signs have the same significance in the various figures. The illustrations are purely schematic and do not represent any ratios of sizes or dimensions.

Figure 1:
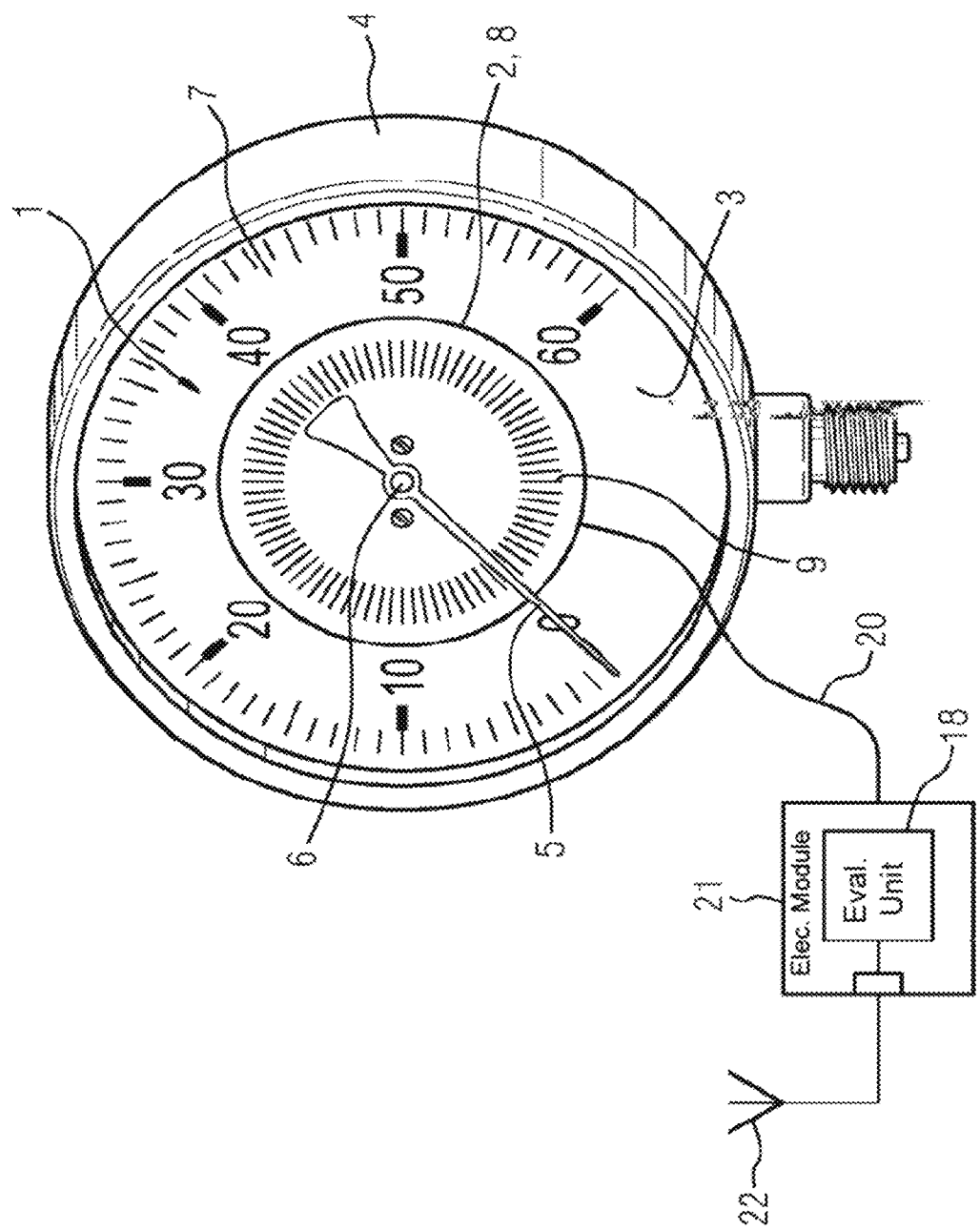
FIG. 1 shows an exemplary embodiment of a capacitive reading device on a pointer instrument in accordance with the invention.

By way of example, FIG. 1 shows an exemplary embodiment of a capacitive reading device 1 having a flat pick-up sensor 2 which is adhered to the window 3 of a pointer instrument 4, a manometer here. The pick-up sensor 2 can also be attached to the pointer instrument 4 in other ways, e.g., clamped on. The pointer instrument 4 is a conventional round instrument with a pointer 5 which, behind the window 3, rotates about an axis 6 above the scale dial or numeric dial 7 of the pointer instrument 4.

The pick-up sensor 2 is arranged and configured such that it faces the pointer 5 so as to detect the complete deflection range of the pointer 5 while allowing the scale markings and at least part of the pointer 5 to remain visible. In particular, wide areas of the pick-up sensor 2 can be transparent.

The pick-up sensor 2 is formed as a support 8 for a multiplicity of n electrodes 9, these being arranged in an arc around the axis 6 of the pointer 5 and substantially radial in their alignment. The arc comprising the electrodes 9 is not necessarily required to be closed if the deflection range of the pointer 5 is less than 360°, e.g., 270°.

Figure 2:
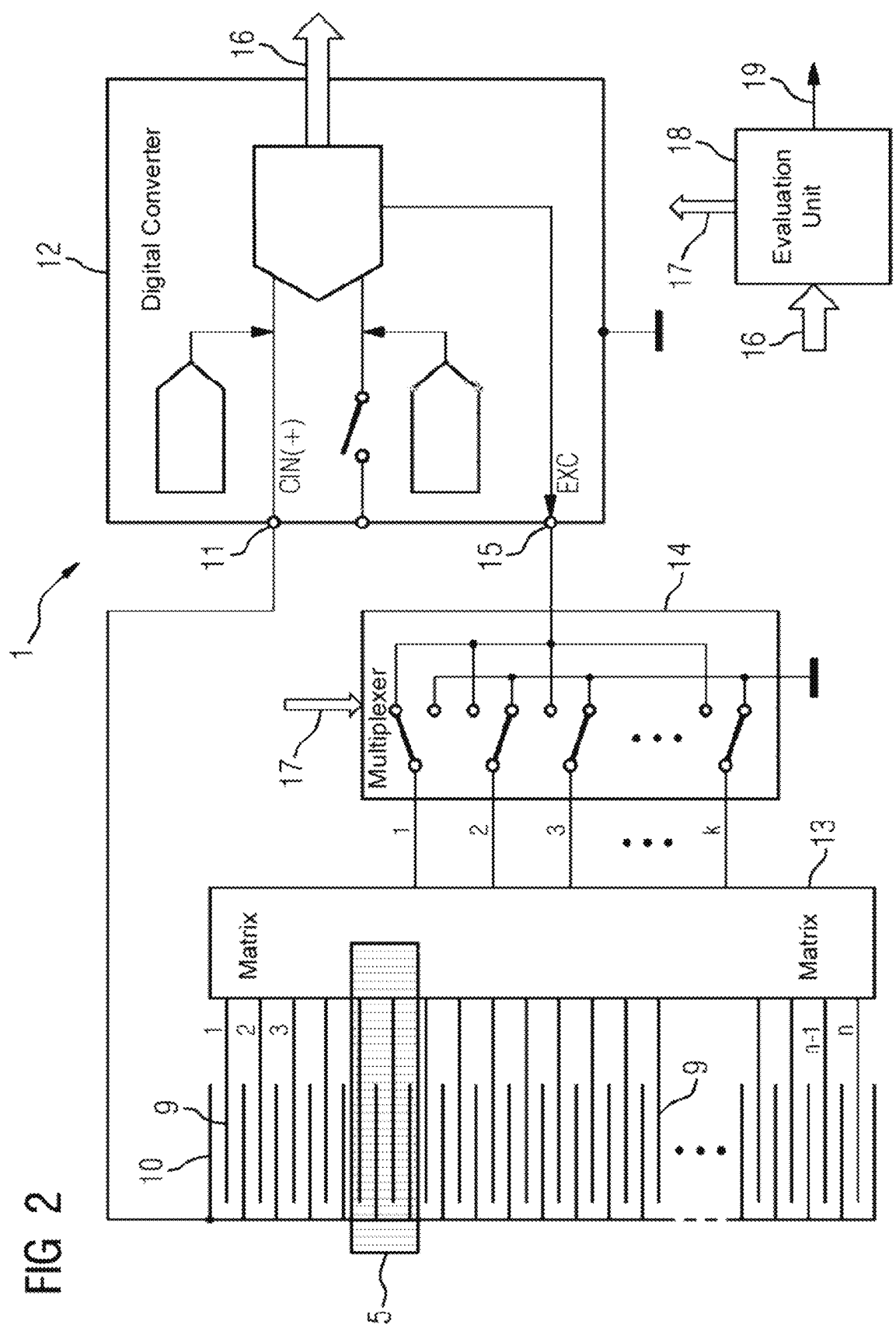
FIG. 2 shows a block schematic diagram of the capacitive reading device of FIG. 1.

FIG. 2 shows a schematic block diagram of the capacitive reading device 1. The radial electrodes 9 are arranged alternately with radial counter electrodes 10, where the arrangement in FIG. 2 is represented as a straight line instead of a circle for purposes of simplicity. The counter electrodes 10 are electrically connected to one another and attached to a first measurement interface 11 of a capacitance digital converter 12. The n electrodes 9 are attached via an n×k connection matrix 13 and a downstream 1-of-k multiplexer 14 to a second measurement interface 15 of the capacitance digital converter 12.

High-resolution capacitance digital converters (CDCs) are available from Analog Devices, Inc. under the designations AD7745/AD7746, for example. Such a CDC detects a capacitance range of 0 to 8 pF with a resolution of 24 bits. The capacitance is measured between the first measurement interface 11 and the second measurement interface 15 and is output as a 24-bit value 16. Here, second measurement interface 15 controls the charging and discharging cycle of the capacitance to be measured. A low-resistance voltage source with a rectangular signal is used in this case.

As explained below with reference to FIG. 3, the n×k connection matrix 13 connects each of the n electrodes 9 to one of the k channels of the 1-of-k multiplexer 14 in each case.

The 1-of-k multiplexer 14 switches one of the k channels through to the second measurement interface 15 of the capacitance digital converter 12 as a function of a control signal 17, and at the same time connects the remaining k−1 channels to ground so that these are neutralized for the capacitance measurement and also act as a screen. A typical example of such a 1-of-k multiplexer 14 is the integrated circuit 74xx238 from the 74xx family of logic circuits. This 3:8 multiplexer/decoder has 8 channels, each of which can be selected as a function of 3 control-side input bits of the control signal 17 that is a 3-bit control signal in this case.

The control signal 17 is generated by an evaluation unit 18 to periodically and successively switch each of the channels 1 to k through to the second measurement interface 15 of the capacitance digital converter 12 and, based on the successively measured 24-bit capacitance values 16, to determine in each case the current position of the pointer 5 and output this as a measured value 19.

As shown in FIG. 1, the pick-up sensor 2 is connected via a lead 20 to an electronics module 21 that contains, e.g., the evaluation unit 18 or parts thereof and has a battery or solar cell for the power supply and a radio interface 22, such as Bluetooth Low Energy (BLE), for the purpose of transmitting the determined pointer position to a supervisory entity. The capacitance digital converter 12, the n×k connection matrix 13 and the 1-of-k multiplexer 14 can be integrated in the pick-up sensor 2. As an alternative to the example in FIG. 1, the electronics module 21 can also be integrated in the pick-up sensor 2.

Figure 3:
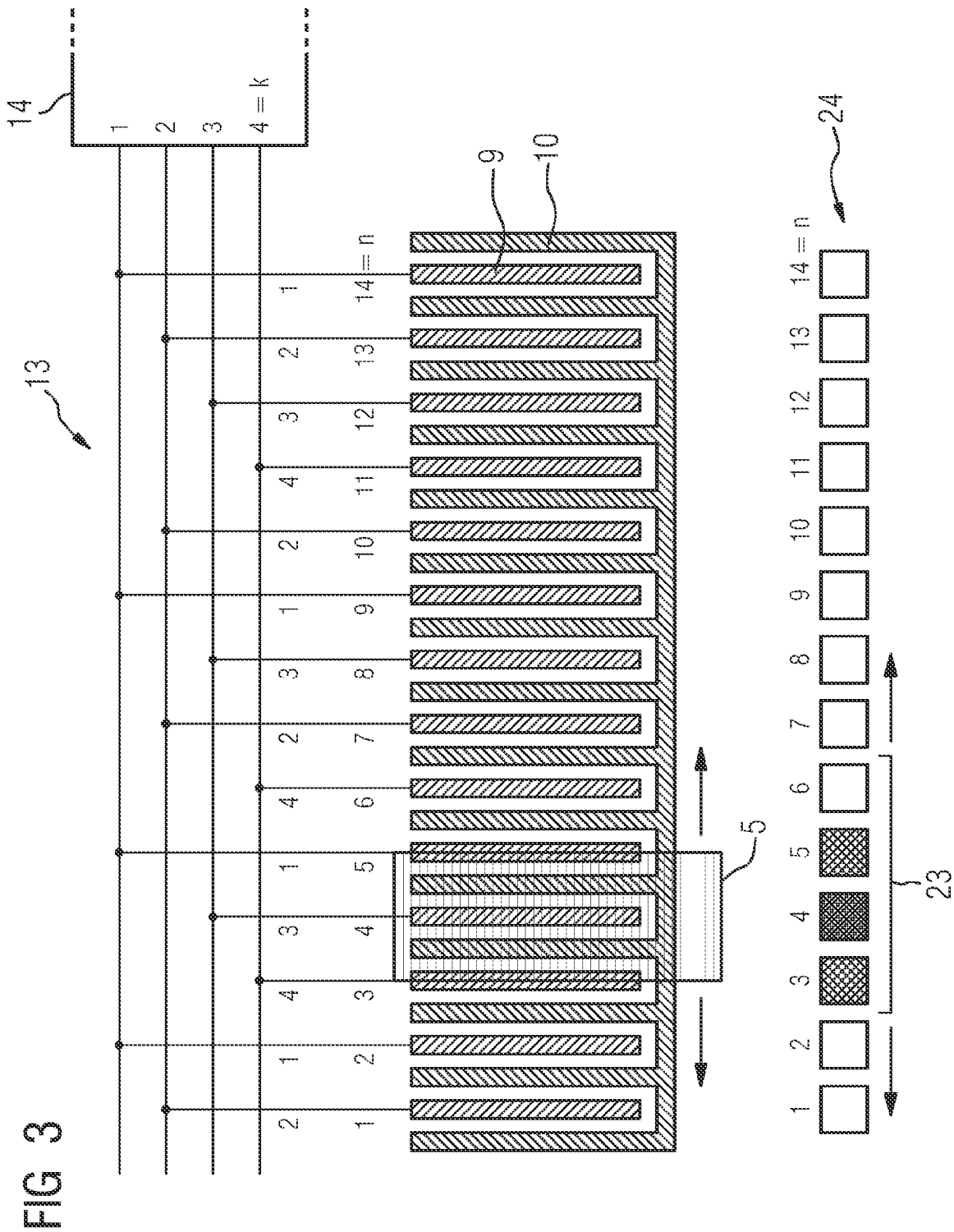
FIG. 3 shows a simple example of the connection of the electrodes to the 1-of-k multiplexer via an n×k connection matrix.

FIG. 3 is used to illustrate the n×k connection matrix 13 with reference to a simple example. The number k, e.g., k=4 in this case, designates the width of a measuring window 23 of k adjacently disposed electrodes 9 for detecting the position of the pointer 5. In the illustrated example, it is assumed that the pointer 5 capacitively influences three (b=3) adjacently disposed electrodes 9, i.e., the capacitances between these electrodes 9 and the intermediate counter electrodes 10. The pointer need not be made of metal for this purpose; it is sufficient for its dielectric constant to be different than that of air. In the example, it is further assumed that the pointer 5 influences the b electrodes 9 to its right and left equally in each case, but that the influence varies with increasing distance from the pointer 5. The capacitive influences on the electrodes 9 by the pointer 5 in its current position are illustrated by different shades of gray in the row 24. In the pointer position shown, of the n electrodes 9, the electrode having the sequential number 4 is the most strongly influenced, the electrodes to the right and left thereof having the numbers 3 and 5 are more weakly influenced, and all other electrodes are not influenced. The k capacitance values that are measured in the measuring window 23 are provided via the n×k connection matrix 13 to the k channels of the 1-of-k multiplexer 14.

Figure 4:
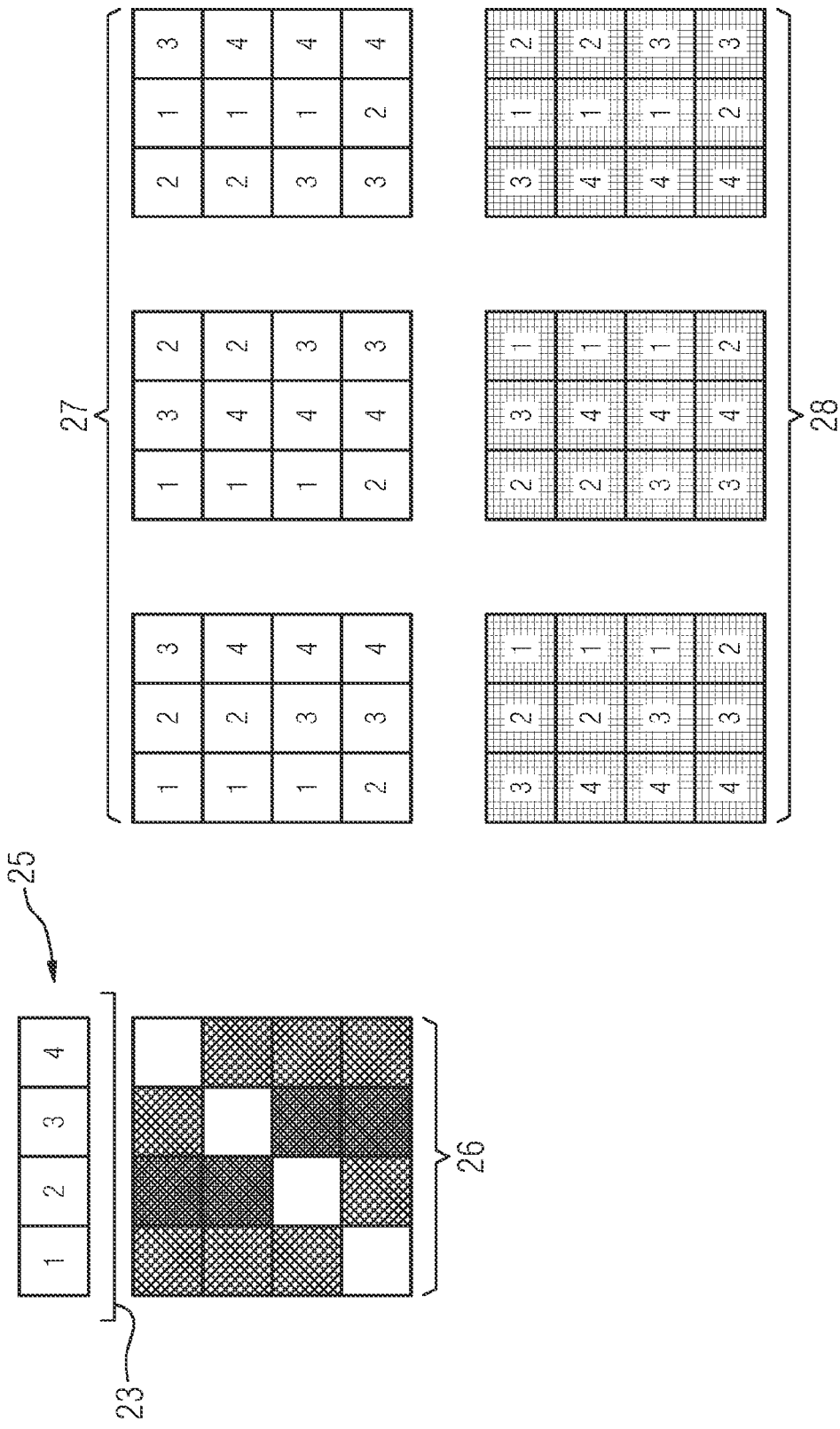
FIG. 4 shows an example of the determination of the connection pattern of the n×k connection matrix.

In the uppermost row 25, FIG. 4 illustrates the four electrodes that are situated in the measuring window 23 at the current position of the pointer 5. Here, the numbers 1, 2, 3, 4=k designate the positions of the electrodes within the measuring window 23.

The block 26 shows all four (4=k!/[(k−b)!·b!]) possible combinations, without repetition, of the b=3 electrodes that are influenced by the pointer 5, from the k=4 electrode positions in the measuring window 23.

The six blocks 27 and 28 together show all twenty-four (24=k!/(k−b)!) possible variations of the b=3 electrodes that are influenced by the pointer 5, from the k=4 electrode positions in the measuring window 23. As explained above, the b electrodes are capacitively influenced differently as the distance from the pointer 5 increases but are capacitively influenced identically in each case to the right and left thereof. As a result, repetitions occur, where the variations in the gray shaded blocks 28 represent repetitions of the variations in the blocks 27. For example, the influence pattern of the electrodes at the positions 1, 2, 3 is identical to the influence pattern of the electrodes at the positions 3, 2, 1.

There are consequently twelve ($12=k!/[2 \cdot (k-b)!]=N$) variations, without repetition, of the $b=3$ electrodes that are influenced by the pointer 5, from the $k=4$ electrode positions in the measuring window 23. It is therefore possible to place the measuring window adjacently N times, shifting it by the amount of one electrode position in each case, whereby different variations of the electrodes that are influenced by the pointer 5 are detected in the different measuring windows 23. In the illustrated example, it is therefore possible to unambiguously detect any pointer position with the aid of $n=N-1+b$ (i.e., fourteen in this case) adjacently disposed electrodes, and output the pointer position on the $k=4$ channels of the 1-of-k multiplexer 14 without any information loss.

In the example shown in FIG. 3, the variations that can be obtained from the blocks 27, 28 according to FIG. 4 are arranged contiguously as follows:

```
2 1 4
  1 4 3
    4 3 1
      etc. ,
``` where variations having the same influence pattern can only be used once, for the reasons specified above. Therefore in the example above, after using the variation "4 3 1", the variation "1 3 4" can no longer be used.

This results in the arrangement shown in FIG. 3 of fourteen ($n=14$) adjacently disposed electrodes 9 that are connected via the $n \times k$ connection matrix 13 to the ($k=4$) channels of the 1-of-k multiplexer 14 in the following sequence:

2 1 4 3 1 4 2 3 1 2 4 3 2 1.

Based on the simple example described above, the following conditions can be derived to achieve a high measuring resolution using the inventive capacitive reading device 1 with the largest possible number of electrodes 9:

The width of the measuring window 23, i.e., the number k of electrodes 9 included in the measuring window 23, is predetermined by the 1-of-k multiplexer 14 that is used in each case.

The width of the electrodes 9 in a circumferential direction of the arc is optimal when it allows as many variations as possible without repeating the b electrodes that are influenced by the pointer 5 from the k electrode positions in the measuring window 23. This is achieved when as many as possible electrodes 9 within the measuring window 23 are influenced differently by the pointer 5. The number of possible variations becomes smaller as the number of electrodes that are influenced either equally or not at all, i.e., cannot be differentiated in either case, increases.

The $n \times k$ connection matrix 13 is used to attach multiple or many electrodes to each channel of the 1-of-k multiplexer 14 simultaneously. Consequently, measuring interferences can occur if the number b of electrodes that are simultaneously and measurably influenced by the pointer 5 is greater than the width k of the measuring window.

In both of the cited cases, with the contiguous arrangement of variations exemplified above with reference to FIG. 4, a condition can be introduced in the form of a separation rule according to which a minimum separation $e < k$ must be present in each case between all electrodes that are connected to one and the same channel of the 1-of-k multiplexer 14, where the separation contains $e-1$ further electrodes that are connected to other channels.

Examples

If $b=3$ and $k=4$, then there are 30 variations for the creation of the connection pattern of the $n \times k$ connection matrix 13. If $e=4$, then the number of variations is reduced to 23 and a connection pattern ($n=23-1+b=25$) is produced as follows:

2 1 3 4 2 1 5 3 2 4 1 3 5 4 1 2 3 4 5 2 3 1 5 2 4.

If $b=3$, $k=8$ and $e=7$, then 117 of the 168 variations originally possible can be arranged contiguously and the following connection pattern ($n=117-1+b=119$) is produced:

| 2 | 1 | 3 | 4 | 5 | 6 | 7 | 2 | 1 | 8 | 3 | 4 | 6 | 5 | 2 | 1 | 7 | 3 | 4 | 8 | 5 | 2 | 6 | 1 | 3 | 7 | 4 | 5 | 2 | 8 | 1 |
| 3 | 6 | 4 | 5 | 7 | 2 | 8 | 3 | 1 | 4 | 6 | 7 | 5 | 2 | 3 | 8 | 4 | 6 | 1 | 5 | 2 | 7 | 3 | 8 | 6 | 1 | 4 | 2 | 5 | 3 | 7 |
| 6 | 1 | 8 | 4 | 5 | 3 | 2 | 6 | 7 | 1 | 4 | 5 | 8 | 2 | 3 | 6 | 7 | 4 | 1 | 5 | 8 | 3 | 6 | 2 | 4 | 7 | 1 | 8 | 5 | 6 | 3 |
| 4 | 2 | 7 | 1 | 5 | 6 | 8 | 4 | 2 | 3 | 1 | 5 | 7 | 8 | 6 | 4 | 2 | 1 | 5 | 3 | 8 | 7 | 4 | 6 | 2 | 1. | | | | | |

The contiguous arrangement of the variations for creating the connection pattern of the electrodes 9 to the channels of the 1-of-k multiplexer 14 can be effected via simple automatic numerical calculation.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A capacitive reading device for a pointer instrument, comprising
   a support for arrangement opposite to a rotating pointer of the pointer instrument;

a plurality of n radial electrodes alternating with radial counter electrodes arranged in an arc on the support; and a capacitance digital converter;

wherein the radial counter electrodes are electrically connected to one another and are attached to a first measurement interface of the capacitance digital converter;

wherein the n radial electrodes are attached via an n×k connection matrix and via a downstream 1-of-k multiplexer to a second measurement interface of the capacitance digital converter; and wherein the n×k connection matrix connects each of the n radial electrodes to a respective k channel of k channels of the 1-of-k multiplexer, a connection pattern along the arc varying to permit determination of a position of the pointer.

2. The capacitive reading device as claimed in claim 1, wherein the connection pattern along the arc varies with n variations of k minus b where n>k≥b>1.

3. The capacitive reading device as claimed in claim 2, wherein the n variations of k minus b are formed taking a sequence of the channels into account.

4. The capacitive reading device as claimed in claim 3, wherein the capacitive reading device is configured to determine a strength of a capacitive influence of at least one channel.

5. The capacitive reading device as claimed in claim 2, wherein the capacitive reading device is configured to determine a strength of a capacitive influence of at least one channel.

6. The capacitive reading device as claimed in claim 1, wherein the capacitive reading device is configured to determine a strength of a capacitive influence of at least one channel.

7. The capacitive reading device as claimed in claim 1, wherein the n radial electrodes are arranged in a closed circle.

8. The capacitive reading device as claimed in claim 1, wherein the 1-of-k multiplexer is configured and controlled such that one k channel of the k channels is successively selected and the remaining k−1 channels are connect to ground.

* * * * *